United States Patent
Savelieva

(10) Patent No.: US 10,123,549 B2
(45) Date of Patent: Nov. 13, 2018

(54) METHOD FOR MANUFACTURING AN EMBOSSED DECORATIVE ELEMENT AND CONFECTIONARY ARTICLE WITH AN EMBOSSED DECORATIVE ELEMENT

(71) Applicant: MARS, INCORPORATED, McClean, VA (US)

(72) Inventor: Olga Evgenievna Savelieva, Moscow (RU)

(73) Assignee: MARS, INCORPORATED, McLean, VA (US)

(*) Notice: Subject to any disclaimer, the term of this patent is extended or adjusted under 35 U.S.C. 154(b) by 1026 days.

(21) Appl. No.: 14/382,217

(22) PCT Filed: Feb. 28, 2013

(86) PCT No.: PCT/RU2013/000158
§ 371 (c)(1),
(2) Date: Aug. 29, 2014

(87) PCT Pub. No.: WO2013/129974
PCT Pub. Date: Sep. 6, 2013

(65) Prior Publication Data
US 2015/0024097 A1 Jan. 22, 2015

(30) Foreign Application Priority Data
Mar. 1, 2012 (RU) ................. 2012107778

(51) Int. Cl.
| A23G 1/00 | (2006.01) |
| A23G 1/30 | (2006.01) |
| A23G 1/50 | (2006.01) |

(52) U.S. Cl.
CPC .......... *A23G 1/005* (2013.01); *A23G 1/0066* (2013.01); *A23G 1/0096* (2013.01); *A23G 1/305* (2013.01); *A23G 1/50* (2013.01)

(58) Field of Classification Search
CPC ..... A23G 1/005; A23G 1/0059; A23G 1/0066
See application file for complete search history.

(56) References Cited

U.S. PATENT DOCUMENTS

| 4,369,200 A | 1/1983 | Iwao et al. |
| 4,426,402 A * | 1/1984 | Kaupert ................. A23G 1/205 425/547 |
| 4,501,544 A | 2/1985 | Akutagawa |

(Continued)

FOREIGN PATENT DOCUMENTS

| CN | 101912023 | 12/2010 |
| EP | 0548814 A1 | 6/1993 |

(Continued)

*Primary Examiner* — Jenna A Watts

(57) ABSTRACT

The invention relates to the production of confectionary articles with a shaped ornament or with a single-colored or multi-colored embossed design on one of the surfaces of the article. The main characteristic of the present invention consists in that a prepared chocolate/chocolate-like mass is fed into a full-scale mold in a dispersed dropping state through a nozzle at a drip rate ensuring plastic deformation of the drops as the drops slow down. The technical result of using the proposed invention is an increase in the quality of confectionary articles with a three-dimensional embossed decorative design.

20 Claims, 1 Drawing Sheet

(56) References Cited

U.S. PATENT DOCUMENTS

| | | | |
|---|---|---|---|
| 5,439,695 A * | 8/1995 | Mackey | A23G 1/18 426/516 |
| 5,443,856 A | 8/1995 | Akutagawa | |
| 5,820,910 A * | 10/1998 | Jury | A23G 1/20 426/516 |
| 6,200,125 B1 | 3/2001 | Akutagawa | |
| 6,391,356 B1 * | 5/2002 | Willcocks | A23G 1/18 426/306 |
| 7,223,428 B2 | 5/2007 | Willcocks | |
| 2002/0176918 A1 * | 11/2002 | Willcocks | A23G 1/0059 426/512 |
| 2004/0227054 A1 | 11/2004 | Teh | |

FOREIGN PATENT DOCUMENTS

| | | |
|---|---|---|
| GB | 2459255 A | 10/2009 |
| JP | S63301749 A | 12/1988 |
| RU | 2336711 C1 | 10/2008 |

* cited by examiner

METHOD FOR MANUFACTURING AN EMBOSSED DECORATIVE ELEMENT AND CONFECTIONARY ARTICLE WITH AN EMBOSSED DECORATIVE ELEMENT

FIELD OF THE INVENTION

The invention is related to food industry, to the production of confectionary articles, and more specifically to a method for manufacturing confectionary articles with a shaped ornament or with a single-colored or multi-colored embossed pattern on one of the surfaces of the article.

STATE OF THE ART

At the present time manufacturers of confectionary articles try to give the articles as attractive an appearance as possible. To this end the manufacturers of confectionary articles cover the surface of the confectionary article with decorative patterns making the confectionary article attractive for the potential user.

A method for manufacturing a decorative confectionary article is known, including preparation of some kinds of confectionary mass differing from each other in composition and color; feeding the heated multi-colored confectionary masses through nozzles, as separate strands or cords, onto a side surface of a full-scale mould for making the confectionary article; forming a decorative pattern from these strands on the side surface of the full-scale mould, followed by filling the full-scale mould with a basic confectionary mass forming the body of the confectionary article, whereupon the mould and confectionary mass filling the mould are cooled, and the confectionary article is taken out (U.S. Pat. No. 6,200,125, NPC 425/462, filed on Mar. 13, 2001). This method is applicable for making confectionary articles of simple geometric shape and does not allow for the production of confectionary articles with an embossed decorative pattern.

A method for manufacturing a decorative confectionary article is known, including preparation of the main body of a confectionary article by means of any known method, from any kind of confectionary mass, followed by applying a decorative pattern on the surface of the confectionary article body. The application of the pattern is implemented by printing the pattern on the chocolate surface of the confectionary article body using water-based food-grade paints, for which purpose this surface is heated to the chocolate melting point (GB Patent No. 2459255, A23G 1/30, filed on Oct. 21, 2009). This method is difficult to realize because it requires a special printer and a complicated program to manage the sprayers that are used to apply the food-grade paints. Moreover, it is unusable for making confectionary articles with an embossed decorative pattern because it is impossible to obtain the embossed pattern by means of a printer.

A method for manufacturing a decorative confectionary article with an embossed decorative pattern is known, including preparation of a batch of the confectionary mass; feeding the batch of the confectionary mass into the moulding device; and moulding the confectionary article using a built-up mould composed of separate elements, the embossed pattern being situated on the surface of one of the elements (U.S. Pat. No. 7,223,428, A23G 3/50, May 29, 2007). By means of this method it is possible to carry out large-scale production of confectionary articles from a homogeneous composition, with only a primitive embossed pattern, for example, an inscription.

A method for manufacturing a decorative confectionary article with an embossed decorative pattern is known, including preparation of a first confectionary mass to form a single-layered embossed decorative element, and preparation of a basic confectionary mass to form the main body of the confectionary article; heating prepared first confectionary mass to the preset temperature; feeding a batch of the confectionary mass to a first mould having an embossed pattern on the appropriate surface of the mould to form the embossed decorative element; exposing the filled mould to vibration to compact the confectionary mass; removing an excess of the confectionary mass from the surface of the first mould; connecting a second mould to the first mould for making a full-scale mould to form the confectionary article; heating the basic confectionary mass to a preset temperature; feeding a batch of the basic confectionary mass to the full-scale mould; exposing the filled full-scale mould to vibration to compact the basic confectionary mass; whereupon the full-scale mould and the first confectionary mass and the basic confectionary mass filling it are cooled, and the confectionary article is taken off the mould (U.S. Pat. No. 4,501,544, A23G 1/26, Feb. 26, 1985). This method permits producing the confectionary article itself with a single-layered decorative element, and in principle it is possible to make the decorative element itself, but the decorative element will have dimensions that entirely coincide with those of the first mould.

In all the known methods of preparing confectionary articles from a confectionary mass (chocolate and chocolate-like masses), the confectionary mass is fed into the mould either as a separate portion, its volume conforming to the embossed decorative element or to the basic body of the confectionary article, or as a strand or cord of the confectionary mass. In both cases the large volume of the confectionary mass comes at once in contact with the surface of the embossed pattern in the mould, resulting in many cases in blocking of air bubbles in the grooves of the embossed pattern. It is rarely possible to remove such bubbles by means of vibration and increased pressure during shaping, thus deteriorating the quality of the confectionary article.

BRIEF DESCRIPTION OF THE INVENTION

To meet the market requirements it is necessary to propose large-scale production technology for making high-quality confectionary articles with different single-layered and multi-layered embossed decorative elements having three-dimensional decorative pattern (ornament), which is suitable for manufacturing such confectionary articles directly in a full-scale (full-size) mould, precisely keeping all the elements of the embossed pattern. Also a method for making single-layered and multi-layered decorative elements is required which can be applied to the production of both embossed decorative elements themselves, having three-dimensional ornamentation, and to such decorative elements as a part of the confectionary article.

To solve the formulated problems, a method of manufacturing a single-layered embossed decorative element for a confectionary article is proposed, the method comprising: preparing a chocolate or chocolate-like mass to form the decorative element; heating the prepared chocolate or chocolate-like mass to a preset temperature; feeding the heated chocolate or chocolate-like mass into a mould with a three-dimensional embossed pattern on an appropriate surface of the mould, in a quantity sufficient to form the single-layered decorative element; the prepared mass being fed into the mould in a dispersed dropping state through a nozzle at a drip rate ensuring plastic deformation of the drops as the drops slow down; whereupon the mould and the mass filling the mould are cooled, and the single-layered embossed decorative element is taken off the mould.

Furthermore, the mould during its filling is exposed to vibration, compacting the heated chocolate or chocolate-like mass residing in the mould.

Preferably, the chocolate mass is tempered before it is fed into the mould.

Preferably, during the preparation of the chocolate or chocolate-like mass, any of: chocolate, or glaze, or another fat-containing confectionary mass containing chocolate or glaze, or another fat-containing confectionary mass based on equivalents, cocoa butter replacers or vegetable fats, is used.

It is preferable to preheat the mould to a temperature in the range of 10° C.-80° C. before feeding the heated chocolate or chocolate-like mass to the mould.

In addition, the embossed pattern of the decorative element can be made so that the individual elements of the embossed pattern have the same elevation; the thickness of the embossed decorative pattern being either larger than the maximum height of the embossed pattern elements or smaller than the maximum height of the embossed pattern elements.

In addition, the embossed pattern of the decorative element can be made so that the individual elements of the embossed pattern have different elevations; the thickness of the embossed decorative pattern being either larger than the maximum height of the embossed pattern elements or smaller than the maximum height of the embossed pattern elements.

To solve the formulated problem, a method for manufacturing a confectionary article with an embossed decorative element is also proposed, the method comprising:

preparing a first chocolate or chocolate-like mass to form the embossed decorative element;

preparing a basic chocolate or chocolate-like mass to form the main body of the confectionary article;

heating the first chocolate or chocolate-like mass to a preset temperature; feeding a batch of the heated first chocolate or chocolate-like mass, with a volume sufficient to form a single-layered decorative element the with embossed pattern, into a full-scale mould to make the confectionary article with the three-dimensional embossed pattern on the corresponding surface of the mould, the heated first chocolate or chocolate-like mass being fed into the full-scale mould in a dispersed dropping state through a nozzle at a drip rate ensuring plastic deformation of the drops as the drops slow down, thereby forming the first layer of the confectionary article constituting the embossed decorative element;

heating the basic chocolate or chocolate-like mass to a preset temperature; feeding a batch of the heated basic chocolate or chocolate-like mass to the full-scale mould with the formed embossed element, onto the free upper surface of this embossed element; the heated basic chocolate or chocolate-like mass being fed into the full-scale mould in an amount sufficient to form the main body of the confectionary article; whereupon the full-scale mould with the first chocolate or chocolate-like mass and the basic chocolate or chocolate-like mass filling it are cooled, and the confectionary article is taken off the mould.

Preferably, in the course of filling with the first chocolate or chocolate-like mass the mould is exposed to vibration, compacting the heated first chocolate or chocolate-like mass residing in the mould.

Preferably, in the course of filling with the basic chocolate or chocolate-like mass the mould is exposed to vibration, compacting the basic chocolate or chocolate-like mass contained in the mould.

Preferably, chocolate, or glaze, or another fatty confectionary mass of chocolate or glaze, or another fatty confectionary mass based on equivalents, cocoa butter replacers or vegetable fats, is used in the preparation of the first and the basic chocolate or chocolate-like mass.

In this case, the preparation of the basic chocolate or chocolate-like mass is carried out simultaneously with the preparation of the first chocolate or chocolate-like mass.

Furthermore, the first chocolate or chocolate-like mass and the basic chocolate or chocolate-like mass can have the same composition; or the first chocolate or chocolate-like mass and the basic chocolate or chocolate-like mass can have different compositions.

Preferably, the first chocolate mass is tempered before it is fed into the mould.

Furthermore, crushed nuts are further added to the first chocolate or chocolate-like mass.

It is preferable to preheat the mould to a temperature in the range of 10° C.-80° C. before feeding the heated chocolate or chocolate-like mass to the mould.

In addition, the embossed pattern of the decorative element is made so that the individual elements of the embossed pattern have the same elevation; the thickness of the embossed decorative pattern being either larger than the height of the embossed pattern elements or smaller than the height of the embossed pattern elements.

In addition, the embossed pattern of the decorative element is made so that the individual elements of the embossed pattern have different elevations; the thickness of the embossed decorative pattern being either larger than the height of the embossed pattern elements or smaller than the maximum height of the embossed pattern elements.

Preferably, the basic chocolate mass is tempered before it is fed into the mould.

Furthermore, crushed nuts and/or raisins are further added to the basic chocolate or chocolate-like mass.

Preferably, the heated basic chocolate or chocolate-like mass is fed into the full-scale mould in a dispersed dropping state, through a nozzle, at a drip rate ensuring plastic deformation of the drops as the drops slow down.

In addition, in the course of filling the full-scale mould with the first chocolate or chocolate-like mass, the mould is exposed to vibration, compacting the basic chocolate or chocolate-like mass residing in the mould.

To solve the formulated problem, a method for manufacturing a multi-layered embossed decorative element for a confectionary article is also proposed, the method comprising:

preparing a first chocolate or chocolate-like mass to form a first layer of the embossed decorative element; preparing at least one additional chocolate or chocolate-like mass, with a composition differing from the composition of the first chocolate or chocolate-like mass, to form at least one additional layer of the decorative embossed element;

heating the first chocolate or chocolate-like mass to a preset temperature; feeding a batch of the heated first chocolate or chocolate-like mass, with a volume sufficient to form the first layer of the decorative element with the embossed pattern, into a mould for making the confectionary article with a three-dimensional embossed pattern on the appropriate surface of the mould; the heated first chocolate or chocolate-like mass being fed into the mould in a dispersed dropping state, through a nozzle, at a drip rate ensuring plastic deformation of the drops as the drops slow down, thus forming the first layer of the embossed decorative element;

heating the at least one additional chocolate or chocolate-like mass to a preset temperature; feeding a batch of this additional chocolate or chocolate-like mass, with a volume sufficient to form at least one additional layer of the decorative element with the embossed pattern, into the mould containing the formed first layer of the embossed element, onto the free upper surface of this layer of the embossed element; this heated additional chocolate or chocolate-like mass being fed into the mould in a dispersed dropping state, through a nozzle, at a drip rate ensuring plastic deformation of the drops as the drops slow down, thus forming at least one additional layer of the embossed decorative element; and when formation of all the layers of the embossed decorative element is complete, the mould and the first chocolate or chocolate-like mass filling the mould as well as all the additional chocolate or chocolate-like masses are cooled, and the multi-layered embossed decorative element is taken off the mould.

Preferably, in the course of filling the mould with the first chocolate or chocolate-like mass the mould is exposed to vibration, compacting the heated chocolate or chocolate-like mass residing in the mould.

Furthermore, in the course of filling the mould with the additional chocolate or chocolate-like mass the mould is exposed to vibration, compacting this heated additional chocolate or chocolate-like mass residing in the mould.

Preferably, in the course of preparation of the first chocolate or chocolate-like mass and any additional chocolate or chocolate-like mass, chocolate or glaze, or another fatty confectionary mass of chocolate or glaze, or another fatty confectionary mass based on equivalents, cocoa butter replacers or vegetable fats is used.

In this case, the preparation of any additional chocolate or chocolate-like mass is carried out simultaneously with the preparation of the first chocolate or chocolate-like mass.

Preferably, the first chocolate mass is tempered before it is fed into the mould.

Furthermore, crushed nuts are further added to the first chocolate or chocolate-like mass.

In addition, the embossed pattern of the decorative element can be made so that the individual elements of the embossed pattern have the same elevation; the thickness of the multi-layered embossed decorative element being either larger than the height of the embossed pattern elements or smaller than the height of the embossed pattern elements.

In addition, the embossed pattern of the decorative element can be made so that the individual elements of the embossed pattern have different elevations; the thickness of the multi-layered embossed decorative element being either larger than the height of the embossed pattern elements or smaller than the maximum height of the embossed pattern elements.

In this case, in the course of forming the first layer of the embossed decorative element, the volume of the batch of the heated first chocolate or chocolate-like mass is accepted to be sufficient to partly fill the embossed pattern of the filling mould, according to the thickness of the first layer of the embossed decorative element, thus forming the upper part of the embossed decorative element.

If the number of the embossed decorative element layers is more than 2, in the course of forming each subsequent layer of the embossed decorative element, the volume of the batch of any additional chocolate or chocolate-like mass is accepted to be sufficient to partly fill the embossed pattern of the filling mould, according to the thickness of this layer of the embossed decorative element.

Preferably, at least one of the additional chocolate masses is tempered before being fed into the mould.

Furthermore, crushed nuts are further added at least into one of the additional chocolate or chocolate-like masses.

Preferably, before feeding the heated first chocolate or chocolate-like mass into the mould, the mould is preheated to a temperature in the range of 10° C. to 80° C.

To solve the formulated problem, a method for manufacturing a confectionary article with a multi-layered embossed decorative element is also proposed, the method comprising:

preparing a first chocolate or chocolate-like mass to form the first layer of the embossed decorative element;

preparing at least one additional chocolate or chocolate-like mass with a composition differing from that of the first chocolate or chocolate-like mass, to form at least one additional layer of the decorative embossed element;

preparing a basic chocolate or chocolate-like mass to form the main body of the confectionary article;

heating the first chocolate or chocolate-like mass to a preset temperature; feeding a batch of the heated first chocolate or chocolate-like mass, with a volume sufficient to form the first layer of the decorative element with embossed pattern, into a full-scale mould for manufacturing the confectionary article with a three-dimensional embossed pattern on the appropriate surface of the full-scale mould; the heated first chocolate or chocolate-like mass being fed in a dispersed dropping state through a nozzle at a drip rate ensuring plastic deformation of the drops as the drops slow down, thus forming the first layer of the embossed decorative element, preparing at least one additional chocolate or chocolate-like mass with a composition differing from that of the first chocolate or chocolate-like mass, to form at least one additional layer of the decorative embossed element; heating this at least one additional chocolate or chocolate-like mass to a preset temperature; feeding a batch of this heated additional chocolate or chocolate-like mass, with a volume sufficient to form at least one additional layer of the decorative element with embossed pattern, into the full-scale mould containing the formed first layer of the embossed element, onto the free upper surface of this embossed element layer; this heated additional chocolate or chocolate-like mass being fed into the full-scale mould in a dispersed dropping state, through the nozzle, at a drip rate ensuring plastic deformation of the drops as the drops slow down, thus forming at least one additional layer of the embossed decorative element, and, when the formation of all the layers of the multi-layered embossed decorative element is completed, the main body of the confectionary article is formed by:

heating the basic chocolate or chocolate-like mass to a preset temperature; feeding a batch of the heated basic chocolate or chocolate-like mass into the full-scale mould containing the formed multi-layered embossed element, onto the free upper surface of this embossed element; the heated basic chocolate or chocolate-like mass being fed into the full-scale mould in an amount sufficient to form the main body of the confectionary article, whereupon the full-scale mould and all the chocolate and/or chocolate-like mass are cooled, and the confectionary article is taken off the mould.

Furthermore, in the course of filling the mould with the first chocolate or chocolate-like mass, the mould is exposed to vibration, compacting the heated first chocolate or chocolate-like mass residing in the mould.

Preferably, in the course of filling the mould with this additional chocolate or chocolate-like mass, the mould is exposed to vibration, compacting this heated additional chocolate or chocolate-like mass residing in the mould.

Preferably, in the course of filling the full-scale mould with the basic chocolate or chocolate-like mass, the mould is exposed to vibration, compacting the basic chocolate or chocolate-like mass contained in the mould.

Preferably, in the course of preparing the first chocolate or chocolate-like mass, any additional chocolate or chocolate-like mass and the basic chocolate or chocolate-like mass, chocolate, or glaze, or another fatty confectionary mass of chocolate or glaze, or another fatty confectionary mass based on equivalents, cocoa butter replacers or vegetable oils is used.

Furthermore, the preparation of any additional chocolate or chocolate-like mass, or basic chocolate or chocolate-like mass, is carried out simultaneously with the preparation of the first chocolate or chocolate-like mass.

Preferably, the first chocolate mass is tempered before it is fed into the mould.

Furthermore, crushed nuts are optionally added to the first chocolate or chocolate-like mass.

In addition, the embossed pattern of the decorative element is made so that the individual elements of the embossed pattern have the same elevation; the thickness of the multi-layered embossed decorative element being either larger than the height of the embossed pattern elements or smaller than the height of the embossed pattern elements.

In addition, the embossed pattern of the decorative element is made so that the individual elements of the embossed pattern have different elevations; the thickness of the multi-layered embossed decorative element being either larger than the height of the embossed pattern elements or smaller than the maximum height of the embossed pattern elements.

Furthermore, in the course of forming the first layer of the embossed decorative element, the volume of the batch of the heated first chocolate or chocolate-like mass is accepted to be sufficient to partly fill the embossed pattern of the filling mould, according to the thickness of the first layer of the embossed decorative element, forming the upper part of the embossed decorative element.

Furthermore, when the number of the embossed decorative element layers is more than 2, in the course of forming each subsequent layer of the embossed decorative element, the volume of the batch of any additional chocolate or chocolate-like mass is accepted to be sufficient to partly fill the embossed pattern of the filling mould, according to the thickness of this layer of the embossed decorative element.

Preferably, the at least one additional chocolate mass is tempered before it is fed into the mould.

In addition, crushed nuts are further added to the at least one additional chocolate or chocolate-like mass.

Preferably, before feeding the heated first chocolate or chocolate-like mass into the mould, the mould is preheated to a temperature in the range of 10° C. to 80° C.

Preferably, the basic chocolate mass is tempered before it is fed into the mould.

In addition, crushed nuts and/or raisins are further added to the basic chocolate or chocolate-like mass.

Preferably, the heated basic chocolate or chocolate-like mass is fed into a full-scale mould in a dispersed dropping state, through a nozzle, at a drip rate ensuring plastic deformation of the drops as the drops slow down.

Furthermore, in the course of filling the full-scale mould with the basic chocolate or chocolate-like mass, the mould is exposed to vibration, compacting the basic chocolate or chocolate-like mass contained in the full-scale mould.

The main feature of the present invention consists in that during the course of forming the embossed decorative element, the prepared chocolate or chocolate-like mass is fed into the full-scale mould in a dispersed dropping state, through a nozzle, at a drip rate ensuring plastic deformation of the drops as the drops slow down. This makes it possible to regulate precisely the quantity of the confectionary mass which can be fed into the mould, by means of controlling the pressure gradient at the nozzle and the duration of feeding of the confectionary mass through the nozzle. There is therefore no need to pre-measure a portion of confectionary mass in order to form the decorative embossed element (or the main body of the confectionary article). In addition, it is possible to feed the confectionary mass through the nozzle in a volume sufficient to form only one separate layer of the decorative embossed element. With a drip feed through the nozzle, the chocolate mass is uniformly applied to the surface of the mould by individual drops of sufficiently small volume, which enables timely removal of air from the grooves of the relief pattern on the surface of the mould and at the same time increases the quality of the embossed decorative element and of the confectionary article as a whole. If the confectionary mass is applied uniformly, it is possible to form an extremely thin embossed decorative element layer comparable in thickness to printing carried out according to GB Patent No. 2459255, and to obtain high-quality multi-layered embossed decorative elements.

In the course of the dropwise feeding of the confectionary mass, the effect of vibration further promotes the quick levelling of the confectionary mass layer, which is especially important for manufacturing the multi-layered embossed decorative elements, and it also compacts the confectionary mass.

By modifying the composition of mixtures being fed into the full-scale mould, it is possible to obtain the confectionary articles having the necessary gustatory quality; using the different modes of chocolate or chocolate-like mass preparation, it is possible to obtain the confectionary articles with different structure and different resistance to outside impacts during storage of the confectionary articles, in particular it is possible to ensure the long-term maintenance of the shape of the confectionary article.

Adding the chocolate or chocolate-like mass in a dropwise manner enables decorative embossed elements of any thickness to be obtained in the full-scale mould, i.e. it is possible to produce the decorative embossed elements of a single-layered or multi-layered embossed decorative element with a thickness that is either larger than the height of the embossed pattern elements or smaller than the height of the embossed pattern elements. In the course of forming an embossed decorative element with a thickness larger than the height of the embossed pattern elements, by means of drip filling the mould according to the present invention, we can obtain a high-quality embossed decorative element with a strength high enough for it to be used as a stand-alone decorative element, to decorate large (massive) confectionary articles including cakes. In the course of forming an embossed decorative element with a thickness smaller than the height of the embossed pattern elements by means of drip filling the mould according to the present invention, due to the tight filling of the grooves of the relief pattern, it is possible to obtain sufficiently strong decorative elements such as inscriptions, or silhouette pattern, or laced decorative element that can be used as a stand-alone decorative element to decorate large (massive) confectionary articles, or as a component of a composed pattern on the surface of the confectionary article.

The general result of utilization of the proposed invention consists in the improvement in the manufacturing quality of confectionary articles with three-dimensional embossed decorative pattern, or in the improved manufacturing quality of a stand-alone embossed decorative element.

BRIEF DESCRIPTION OF THE DRAWINGS

The invention is illustrated by the drawings that comprise the inherent part of the Application. It will be appreciated that the drawings clarify the embodiments of the invention but do not confine the scope of the invention by any means. In the drawings all the similar elements have the same reference numerals.

DETAILED DESCRIPTION OF IMPLEMENTING THE INVENTION

Figure 1:
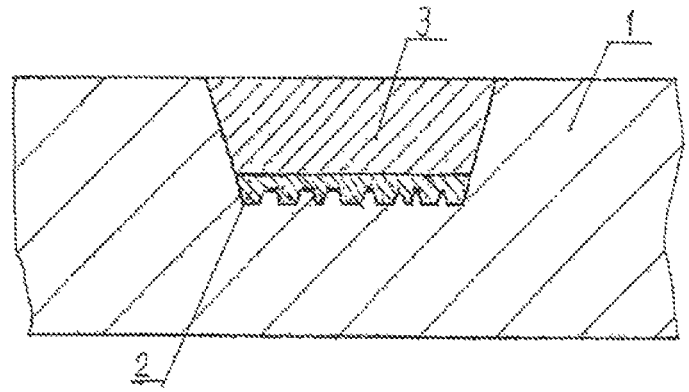
FIG. 1 shows a full-scale mould filled with a chocolate mass in the course of manufacturing a confectionary article with a single-layered embossed decorative element according to one of the embodiments of the invention.
Figure 2:
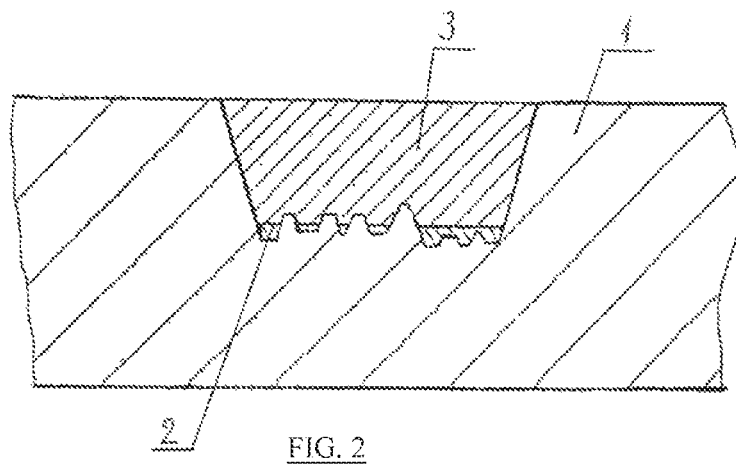
FIG. 2 shows a full-scale mould filled with a chocolate mass in the course of manufacturing a confectionary article with a single-layered embossed decorative element according to another embodiment of the invention.

As shown in FIGS. 1 and 2, a confectionary article with a single-layered decorative element is made using the full-scale mould 1 and contains one layer 2 of chocolate or chocolate-like mass forming the single-layered embossed decorative element. In the embodiment of FIG. 1 an embossed decorative element is accomplished wherein the individual elements of the embossed pattern are the same height. Furthermore, in this embodiment the single-layered embossed decorative element has a thickness exceeding the height of individual elements of the decorative relief. It is possible to make both confectionary article as a whole and a stand-alone embossed decorative element.

The distinction of the embodiment of FIG. 2 consists in the implementation of the embossed pattern and in the thickness of the single-layered embossed decorative element. In this embodiment a decorative element is implemented wherein the singular elements of the embossed pattern have different heights, and wherein the single-layered decorative embossed element has a thickness of layer 2 less than the maximum height of the embossed pattern elements.

Figure 3:
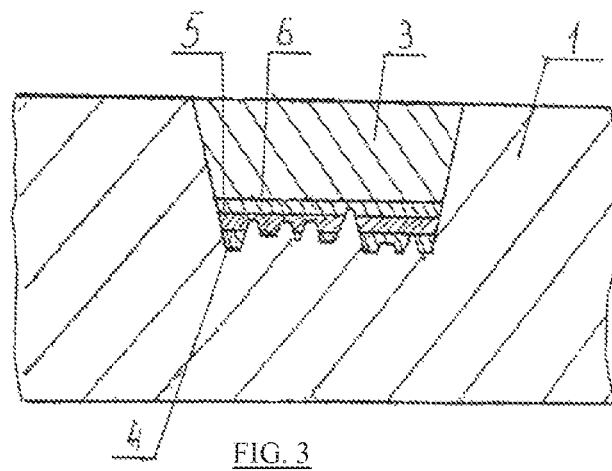
FIG. 3 shows a full-scale mould filled with a chocolate mass in the course of manufacturing a confectionary article with a multi-layered embossed decorative element according to yet another embodiment of the invention.

FIG. 3 shows a confectionary article with a multi-layered embossed decorative element. The confectionary article with multi-layered embossed decorative element is made using the full-scale mould 1 and comprises several layers of chocolate or chocolate-like mass, forming the multi-layered embossed decorative element, and the main body 3. In this case the confectionary article has the embossed decorative element comprising three layers: the first layer 4 and two additional layers 5 and 6. FIG. 3 shows two additional layers 5 and 6, but it is obvious that there can be any number of additional layers. The thickness of the first layer 4 of the embossed decorative element is less than the maximum height of the embossed pattern elements.

It will be appreciated that a multi-layered embossed decorative element can have the same height of decorative embossed pattern elements, as shown in FIG. 1.

First Example of Implementing the Invention

To make the single-layered embossed decorative element according to the present method it is possible to use a special mould but it is preferable to use the full-scale mould 1 for manufacturing the complete confectionary article, to reduce the cost. Prepared chocolate mass is heated, for example to 20-30° C., and the heated chocolate mass is fed dropwise, through the nozzle, into the mould having embossed pattern on its bottom surface. The drops of the chocolate mass are slowed down on impacting with the surface of mould 1, or on impacting with the chocolate mass residing in the mould, entirely filling the three-dimensional pattern on the mould surface. In this case no air bubbles rest in the grooves of the embossed pattern.

The chocolate mass, as well as any other chocolate-like mass, is a non-Newtonian fluid and, unlike a common fluid, it cannot spread over a surface. At the same time, on applying deformation stress to a drop of a non-Newtonian fluid, at a certain shearing stress the drop begins to change in shape and then behaves as a Newtonian fluid. The amount of the deformation stress can be determined indirectly, in particular by investigating the deformation of the chocolate or chocolate-like mass drop on slowing down the drop having a certain rate, on impacting the drop with the mould surface. Thus we obtain experimentally the drop rate sufficient to make the high-quality embossed decorative element, and also the mode of feeding the chocolate mass through the nozzle, in particular the pressure difference at the nozzle depending heavily on the chocolate mass viscosity.

Before adding the chocolate mass, the mould is heated, for example to 40° C. Addition of the chocolate mass is ceased when the embossed three-dimensional pattern is entirely covered. In the course of filling the mould 1, it can be exposed to vibration by applying the vibration in the vertical direction. The vibration compacts the drops of the chocolate mass converting it into homogeneous dense mass. When exposed to vibration, the drops of chocolate mass occurring on the side walls of the mould roll down to the decorative element layer 2, decreasing losses in the chocolate mass. When the drip feeding of the chocolate mass is ceased, the vibration effect on the mould is continued for some time in order to clean the side surfaces of the mould of the chocolate mass drops. Furthermore, it is possible to clean the side walls of the mould of the adhered drops of the chocolate mass by any known means. When the formation of the single-layered embossed decorative element is completed, the mould filled with chocolate mass is cooled, for example to 5° C., whereupon the finished embossed decorative element is taken off the mould.

The chocolate mass can be tempered before feeding it to the mould.

For manufacturing a single-layered embossed decorative element, it is also possible to use any other confectionary mixtures, i.e. glaze or another fatty confectionary mass of chocolate or glaze, or another fatty confectionary mass based on equivalents, cocoa butter replacers or vegetable fats.

As shown in FIG. 1, the single-layered decorative element can constitute a layer 2 which has a thickness that exceeds the maximum height of the elements of the embossed decorative pattern. Thus the manufactured embossed decorative element is hard enough and can also readily be used as a superimposed decorative element for any confectionary articles including large candies, chocolate bars and even cakes.

As shown in FIG. 2, the single-layered decorative element constitute a layer 2 which has a thickness that is smaller than the maximum height of the elements of embossed decorative pattern. In such a way it is possible to manufacture an embossed decorative element in the form of inscription, vignette, outlined pattern, and also it can be used as a superimposed element for decoration of any confectionary article.

In accordance with the present method, it is possible to make the confectionary articles with a single-layered embossed decorative element.

For this purpose, after forming the single-layered embossed decorative element in the full-scale mould, according to the above examples, and, if necessary, after cleaning the side walls of the full-scale mould from the adhered drops of the first chocolate mass, the prepared basic chocolate mass is heated, for example, to 40° C., and the heated chocolate mass is fed through the nozzle to the full-scale mould containing the formed embossed element, onto the free upper surface of this embossed element; furthermore, the heated basic chocolate mass is fed to the full-scale mould in an amount sufficient to form the main body 3 of the confectionary article. In the course of feeding the full-scale mould with the basic chocolate mass, the mould can be exposed to vibration by applying vibration in the vertical direction, compacting the basic chocolate mass filling the full-scale mould; after that the full-scale mould containing the first chocolate mass and the basic chocolate mass is cooled, and the confectionary article is taken off. The control of filling the full-scale mould with the basic chocolate mass can be carried out by any known means.

It is possible to fill the full-scale mould with the basic chocolate mass by any means; but it is preferable to feed the heated basic chocolate mass into the full-scale mould dropwise, through the nozzle, at a drip rate ensuring plastic deformation of the drops as the drops slow down.

The basic chocolate mass can be tempered before feeding it into the mould.

To make a confectionary article it is possible to use any confectionary masses: chocolate, or glaze, or another fat-containing confectionary mass of chocolate or glaze, or another fat-containing confectionary mass based on equivalents, cocoa butter replacers or vegetable fats. Furthermore the first chocolate mass and basic chocolate mass can either have the same composition, or they can have different compositions; also different additives, such as crushed nuts, raisins and any other known food additives can be used.

Second Example of Implementing the Invention

According to the present method it is possible to make multi-layered embossed decorative elements. They can be also manufactured in a special mould but it is preferable to use the full-scale mould 1 intended for manufacturing the complete confectionary article.

For manufacturing the multi-layered embossed decorative element several chocolate or chocolate-like confectionary mass are prepared.

The first prepared chocolate mass for forming the first layer 4 of the embossed decorative element is heated to a preset temperature, for example to 25-40° C.; the heated first chocolate mass is fed dropwise through the nozzle into the mould, wherein there is a three-dimensional embossed pattern on the bottom surface of the mould. Before adding the chocolate mass the mould is heated, for example to 40° C. The addition of the chocolate mass is ceased when the first layer 4 of multi-layered embossed decorative element is formed in the mould, for example, when the bottom part of the embossed three-dimensional pattern is covered. In the course of filling the mould with the first chocolate mass the mould can be exposed to vibration, the vibration being applied in the vertical direction. Vibration compacts the chocolate mass drops converting the mass into homogeneous dense mass. In this case the flat external surface of the first embossed decorative layer 4 is formed. The drops of the chocolate mass occurring on the side walls of the mould roll down to the decorative element layer, decreasing the chocolate mass losses. When the drip feeding of the chocolate mass is ceased, application of the vibration to the mould is continued for some time to clean the side surfaces of the mould from the drops of the chocolate mass. Furthermore, it is possible to clean the side walls of the mould from the adhered drops of the chocolate mass by any known means.

At least one additional chocolate-like confectionary mass is heated to a preset temperature; this heated mass is fed dropwise, through the nozzle, on the free upper surface of the first layer 4 of the embossed decorative element, in which case this heated additional chocolate-like mass is fed into the mould at a drip rate ensuring plastic deformation of the drops as the drops slow down, thereby forming at least one additional layer 5 of the embossed decorative element. In the course of filling the mould with this additional chocolate mass the mould can be exposed to vibration in the vertical direction, compacting this heated additional chocolate-like confectionary mass residing in the mould.

In the course of manufacturing the multi-layered embossed decorative element the last layer, for example layer 6, completely covers the embossed pattern on the bottom surface of the mould.

In the course of manufacturing the multi-layered embossed decorative element with more than two layers, a special chocolate or chocolate-like confectionary mass is prepared to form each subsequent layer of the embossed decorative element, and these masses are fed to the mould respectively, dropwise, with volume sufficient to fill partly the embossed pattern of the filling mould, according to the thickness of the separate layer of the embossed decorative element, permitting the creation of ornamentation matching in quality to a printed image.

These operations are repeated until the shaping of all the layers of the embossed decorative element is completed; the mould containing the first chocolate mass and all additional chocolate-like masses is cooled, and the multi-layered embossed decorative element is taken off the mould.

In this case there is no need to fill entirely the mould for shaping the embossed decorative element because the drip feeding of the confectionary mass into the mould permits the manufacture of high-quality embossed decorative element with a thickness less than the total depth of the mould for shaping the embossed decorative element, because it is not necessary to level its upper surface with a scraper.

To make the multi-layered embossed decorative element it is possible to use any known chocolate and chocolate-like confectionary mixtures including mixtures with additives, for example with fine-crushed nut; tempered mixture and mixtures with any known food additives.

The produced multi-layered embossed decorative element can be used as superimposed decorations for any confectionary articles such as cakes, pastries and so on.

In accordance with the present method, it is possible to make the confectionary articles with a multi-layered embossed decorative element.

To this end, after forming the multi-layered embossed decorative element in the full-scale mould according to the above example and, if necessary, after cleaning the full-scale mould side walls from the adherent drops of chocolate and chocolate-like confectionary mass, the prepared basic chocolate or chocolate-like confectionary mass is heated, for example to 40° C., and the heated basic chocolate or chocolate-like mass is fed through the nozzle into the full-scale mould 1 containing the formed multi-layered embossed element, onto the free upper surface of this embossed element; the heated basic chocolate or chocolate-like mass being fed into the full-scale mould in an amount sufficient to form the main body 3 of the confectionary article; in the course of filling the full-scale mould with the basic chocolate or chocolate-like mass, the mould being exposed to vibration applied in the vertical direction, compacting the basic chocolate or chocolate-like mass contained in the full-scale mould; whereupon the full-scale mould containing the chocolate and/or chocolate-like basic mass is cooled, and the confectionary article is taken off the mould. The control of filling the full-scale mould with the basic chocolate mass can be carried out by any known means.

The full-scale mould 1 can be filled with the basic chocolate mass by any known means, but it is preferable to feed the heated basic chocolate or chocolate-like mass into the full-scale mould 1 dropwise, through a nozzle, at a drip rate ensuring plastic deformation of the drops as the drops slow down.

INDUSTRIAL APPLICABILITY

To manufacture the confectionary article, any confectionary masses can be used: chocolate, or glaze, or another fatty confectionary mass of chocolate or glaze, or another fatty confectionary mass based on equivalents, cocoa butter replacers or vegetable fats. Also different known food additives and filling materials can be used. It should be noted that above embodiments are only exemplary and do not limit the scope of the invention. In implementing the invention, it is possible to use any combinations of techniques from the presented embodiments. Other temperature modes known from practical experience can also be used in implementing the invention, without going outside the scope of the appended Claims.

The invention claimed is:

1. Method for manufacturing an embossed decorative element for a confectionary article, including:
    preparing a first chocolate or chocolate-like mass to form a first embossed decorative element;
    heating the prepared first chocolate or chocolate-like mass to a preset temperature in the range of 25° C. to 40° C. to form a heated first chocolate or chocolate-like mass;
    feeding the heated first chocolate or chocolate-like mass into a mould having a three-dimensional embossed pattern on an appropriate surface of the mould in an amount sufficient to form a first decorative element;
    wherein the mould is heated to a temperature in the range of 40° C. to 80° C. before feeding the heated first chocolate or chocolate-like mass into the mould to produce a heated mould;
    wherein the heated first chocolate or chocolate-like mass is fed into the heated mould in a dispersed dropping state through a nozzle at a drip rate ensuring plastic deformation of the drops as the drops slow down;
    cooling the heated mould filled with the first chocolate or chocolate-like mass; and
    taking off the resulting first embossed decorative element from the mould.

2. The method according to claim 1 wherein the mould filled with the first chocolate or chocolate-like mass is cooled to 5° C.

3. The method according to claim 1 further comprising applying a pressure in the range of 0.1 MPa to 0.7 MPa to feed the heated first chocolate or chocolate-like mass into the heated mould, wherein the pressure is a pressure differential at the nozzle.

4. The method according to claim 1 wherein the three-dimensional pattern engraved on the appropriate surface of the mould has a height of from 0.5 mm to 2.5 mm.

5. The method according to claim 1 wherein the mould, in the course of its filling, is exposed to vibration so as to compact the heated first chocolate or chocolate-like mass residing in the mould.

6. The method according to claim 1 wherein the first chocolate mass is tempered before feeding the mass into the mould.

7. The method according to claim 1 wherein the mould is heated to a temperature of 40° C. before feeding the heated mass into the mould.

8. The method according to claim 1 wherein a full-scale mould is used, in which mould the embossed pattern of the decorative element is made so that separate elements of the embossed pattern have the same height, the embossed decorative element being formed so that the thickness of its layer is either larger or smaller than the height of the embossed pattern elements.

9. The method according to claim 1 wherein a full-scale mould is used, in which mould the embossed pattern of the decorative element is made so that the separate elements of the embossed pattern have different heights, the embossed decorative element being shaped so that the thickness of its layer is either larger or smaller than the maximum height of the embossed pattern elements.

10. The method according to claim 1, further comprising:
    preparing a basic chocolate or chocolate-like mass to form the main body of the confectionery article;
    heating of the basic chocolate or chocolate-like mass to a temperature of 40° C.; feeding a batch of the heated basic chocolate or chocolate-like mass into said mould with the first embossed decorative element so as to cover the free upper surface of this embossed element;
    the heated basic chocolate or chocolate-like mass being fed into said mould in an amount sufficient to form the main body of the confectionery article; after which said mould filled with the first chocolate or chocolate-like mass and the basic chocolate or chocolate-like mass is cooled, and the resulting confectionery article is taken off the mould.

11. The method according to claim 10 wherein, in the course of filling the mould with basic chocolate or chocolate-like mass, the mould is exposed to vibration, so as to compact the basic chocolate or chocolate-like mass in the mould.

12. The method according to claim 10 wherein chocolate, or glaze, or another fat-containing mixed confectionery material containing chocolate or glaze, or another fat-containing mixed confectionery material containing cocoa butter, or equivalent vegetable oils and substitutes, is used in the preparation of the first chocolate or chocolate-like mass and basic chocolate or chocolate-like mass.

13. The method according to claim 10 wherein the preparation of the basic chocolate or chocolate-like mass is carried out simultaneously with the preparation of the first chocolate or chocolate-like mass.

14. The method according to claim 10 wherein the first chocolate or chocolate-like mass and the basic chocolate or chocolate-like mass have substantially or essentially the same composition.

15. The method according to claim 10 wherein the first chocolate or chocolate-like mass and the basic chocolate or chocolate-like mass have different compositions.

16. The method according to claim 10 wherein the basic chocolate mass is tempered before feeding the basic chocolate mass into the mould.

17. The method according to claim 10 wherein crushed nuts and/or raisins are further added to the basic chocolate or chocolate-like mass.

18. The method according to claim 10 wherein the preheated basic chocolate or chocolate-like mass is fed into a full-scale mould in a dispersed dropping state through a nozzle at a drip rate ensuring plastic deformation of the drops as the drops slow down.

19. The method according to claim 1 further comprising:
heating at least one additional chocolate or chocolate-like mass to a preset temperature;
feeding a batch of this heated additional chocolate or chocolate-like mass in a volume sufficient to form at least one additional layer of the decorative element having the embossed pattern, this heated additional chocolate or chocolate-like mass being fed into the mould in a dispersed dropping state through a nozzle at a drip rate ensuring plastic deformation of the drops as the drops slow down, thus forming at least one additional layer of the embossed decorative element.

20. The method according to claim 1 wherein the mould is heated to a temperature of 80° C. before feeding the heated mass into the mould.

* * * * *